May 29, 1951 H. H. BRUDERLIN 2,554,696

MAGNETIC PHONOGRAPH PICKUP HEAD WITH TWO PAIRS OF POLE PIECES

Filed May 26, 1947 2 Sheets-Sheet 1

INVENTOR.
HENRY H. BRUDERLIN
BY
J. Edwin Coates
ATTORNEY

INVENTOR.
HENRY H. BRUDERLIN
BY
Edwin Coates
ATTORNEY

Patented May 29, 1951

2,554,696

UNITED STATES PATENT OFFICE 2,554,696

MAGNETIC PHONOGRAPH PICKUP HEAD WITH TWO PAIRS OF POLE PIECES

Henry H. Bruderlin, Venice, Calif.

Application May 26, 1947, Serial No. 750,581

8 Claims. (Cl. 179—100.41)

This invention relates to signal translating devices and is particularly concerned with devices for reproducing sound from phonograph records or transcriptions. The general type of reproducer to which the features of novelty apply is commonly known as a magnetic pickup.

There are many types of reproducers now available but they have various faults or shortcomings which prevent them from being entirely satisfactory. One desirable feature of a satisfactory pickup is a minimum weight on the stylus to reduce both stylus and record wear. In addition, however, it should have a high output and uniform response over a wide range of usable frequencies.

The present invention takes into account the causes of distortion and needle noise, presents novel means for overcoming them, and includes features providing maximum fidelity and minimum stylus load.

The general construction and arrangement of parts of the present device are such that a simple change in wiring will adapt it to reproduce either lateral or vertical recordings. The armature and stylus are so mounted that their lateral and vertical movements in response to variations in the record groove are substantially independent of each other; i. e., lateral movement does not cause a resultant vertical movement and vice versa.

In a preferred form of the invention the arrangement of the magnetic and electrical components is such that when the coils are connected for lateral reproduction the electrical system responds primarily to lateral movements of the armature, and the signal produced by any chance vertical movements is extremely small. When the coil connections are reversed, the response is primarily to vertical movements of the armature, and the signal produced by any chance lateral movements is very small.

In a preferred form of the invention there is provided a permanent magnet having a pair of pole pieces defining a gap therebetween, and mounted on the pole pieces is a pair of pickup coils having spaced apart coaxial cores, the gap between the pole pieces and that between the cores being in alignment. An armature carrying the reproducing stylus is mounted for movement in the gaps and resiliently supported for such movement in response to the undulations of the record groove. For lateral reproduction the coil windings are so connected to each other that a simultaneous increase in flux passing thru both coils will produce opposing voltages, while a simultaneous increase in flux thru one coil and decrease in flux thru the other coil will produce aiding voltages. For vertical reproduction the coil windings are so connected to each other that a simultaneous increase in flux thru both coils will produce aiding voltages while a simultaneous increase in flux thru one coil and decrease in flux thru the other coil will produce opposing voltages.

The device of the present invention utilizes a construction in which the total magnetic reluctance of the system with the armature torsionally neutral remains essentially constant regardless of vertical deflection of the latter. Accordingly when the recording is of the lateral type the device can accommodate relatively large vertical displacements of the armature-stylus assembly with respect to the body of the pickup produced by bumps, warps, or dirt in the record groove without varying the output voltage.

The novel mounting, and particularly the small size of the armature of the present reproducer, reduce its inertia to a minimum and thereby render it capable of following the record groove with a minimum of resistance. The armature is carried by a cantilever leaf spring, the torsional axis of which extends longitudinally along the spring and substantially coincides with the axis of gyration of the free armature. This axis may be defined as the axis about which the armature would rotate if suspended freely in space without the restraining force of the spring when a lateral excitation is applied at the stylus, the point of suspension being that at which the end of the spring would normally be secured. With an armature of substantially uniform cross-section the axis of gyration of the armature-stylus combination will be approximately two thirds of the length of the armature away from the end to which the stylus is attached.

At all frequencies below the resonant frequency of the stylus-armature-spring combination as installed in the pickup the record groove, thru its coaction with the stylus, forces the armature to vibrate about a longitudinal torsional axis of the spring which lies substantially in the plane of the spring. At all frequencies above such resonant frequency the record groove forces the armature to rotate about its own axis of gyration.

In order to maintain the axis of gyration the same above and below the resonant frequency the spring and armature are connected as above described. At the resonant frequency the axis of gyration is no longer well defined and the motion of the armature is exaggerated. Novel means are provided to damp this exaggerated motion. As a result, it is possible to obtain very uniform response from the lowest desired frequency thru the entire range to the highest desired frequency.

The present invention also comprises novel features of construction which result in great ease of manufacture and assembly and also provide means for very accurate centering of the armature in the gap between the pole pieces both during and after assembly.

By substituting a cutting stylus for the playback stylus shown in the drawings and introducing desired external signals at the terminals of the unit, the device of this invention may be operated as a recorder to cut either vertical or lateral records.

Other features and advantages of the invention will become apparent as the description proceeds. The presently preferred forms of the invention are illustrated in the accompanying drawings in which.

Figures 1, 2, 3, 4, 5, 6:
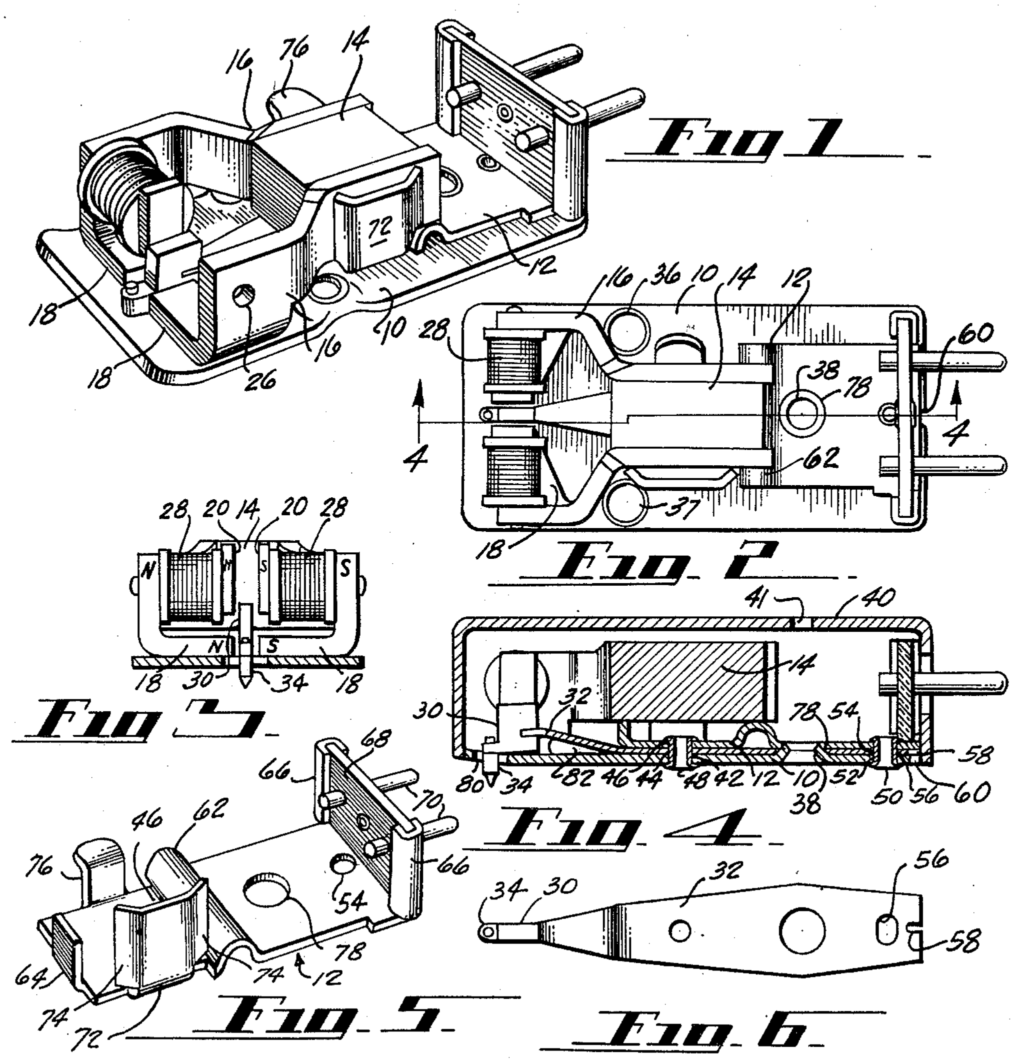
Fig. 1 is a perspective view of one form of the invention including the base plate and essential elements mounted thereon, with one pole piece and coil and the cover removed for clarity of illustration.
Fig. 2 is a top plan view of the device of Fig. 1.
Fig. 3 is a front elevational view of the device of Fig. 1 with the base plate in section.
Fig. 4 is a sectional view taken on line 4—4 of Fig. 2.
Fig. 5 is a perspective view of the magnet supporting member.
Fig. 6 is a top plan view of the cantilever leaf spring support with the armature attached to its forward free end.

The general arrangement of the elements constituting the cartridge of the reproducer or pickup is shown in Fig. 1 in which a base plate 10 carries a support or bracket 12 which in turn holds in their proper position a permanent magnet 14 and a pair of magnet extension arms 16, 16. The latter, at their forward free ends, are each provided with inwardly directed branches 18, 18 forming north and south pole pieces. The permanent magnet may be replaced by an electromagnet if desired.

Figure 7:
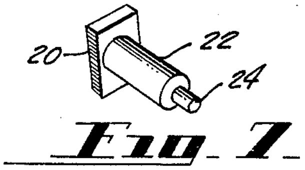
Fig. 7 is a perspective view of one of the pole pieces with its pickup coil removed.

Each arm 16 is further provided with a second pole piece best illustrated in Fig. 7. This pole piece includes a face plate or head 20, a shank 22, and a reduced end portion 24 adapted to be inserted in aperture 26 in its respective arm and riveted over to retain it in place. Each of these pole pieces carries a pickup coil 28 adapted to be electrically connected to each other and to an amplifier as described hereinafter to reproduce recordings.

Referring to Figs. 2 to 4, it will be seen that the armature 30, carried by leaf spring 32, is located, in its neutral condition, centrally in the gap defined by the inner ends of pole pieces 18 and face plates 20 and, by virtue of its mounting, is free to rotate about an axis in the vertical longitudinal plane of symmetry of the pickup, both clockwise and counterclockwise, and to move vertically in the gap under the resilient returning influence of the leaf spring 32. The armature is provided with a stylus 34 rigidly and preferably permanently attached to its forward free edge. The stylus may be attached by cementing or by force fitting it into a hole formed in the body of the armature, or by any other suitable means. The connection between stylus and armature is rigid enough so that the resonant frequency between them will be above the upper limit of the desired usable frequency range.

The gap defined by pole pieces 18 and face plates 20 should be of uniform width to obtain maximum response. However, satisfactory results may be obtained if the gap between face plates 20 is greater or less than that between pole pieces 18 so long as the two gaps are coaxial. If the axes of the gaps are misaligned, rotation of the armature in one direction will produce a stronger signal than an equal rotation in the opposite direction with consequent unsatisfactory performance.

Referring to Figs. 2 and 4 it will be seen that base plate 10 is provided with apertures 36, 37, 38 for the reception of rivets or other fastening elements to retain cartridge cover 40 in assembled relation therewith. It is also provided with an aperture 42, Fig. 4, corresponding in size and location with aperture 44 in leaf spring 32 and aperture 46 in bracket 12. A hollow rivet 48 fits snugly in the three apertures and is peened over to hold the elements firmly together. A second hollow rivet 50 fits snugly in apertures 52 and 54 of the plate and bracket respectively but loosely in the oval aperture 56 of the leaf spring.

With this arrangement, the base plate and bracket are held against relative rotation but leaf spring 32 may be turned slightly about rivet 48 as a pivot, being held securely in any adjusted position by friction with the plate and bracket, between which it is compressively held. Angular adjustment is accomplished by inserting a suitable tool in notch 58 of the spring and urging it clockwise or counterclockwise as desired. A somewhat larger notch 60 is provided at the rear edge of the base plate to facilitate such adjustment. It is thus possible to locate the armature 30 exactly in the center of the gap between the pole pieces as seen in Fig. 3 after the entire unit has been assembled.

Bracket 12, best shown in Fig. 5, comprises a sheet of brass or other non-magnetic material provided with an upstanding laterally extending arch 62 at a medial point, an upwardly bent lug 64 at its forward end and two upwardly extending arms 66 at its rear end, formed as inwardly facing channels. A piece of insulating material 68 is fitted between the channels and is provided with terminals 70 to which the lead wires from coils 28 are attached. Only two terminals are required for reproducing either lateral or vertical records only, but four terminals are provided if it is desired to use the pickup for universal reproduction. An upstanding arm 72 at one side of the forward portion has inwardly bent wings 74, and an arm 76 on the opposite side is located about midway between them. The clear space between the two arms is just slightly less than the combined thickness of the magnet 14 and the two extension arms 16, and when the latter are forced into the space they are securely held in position. The arch 62 and lug 64 support the magnet and extension arms at the proper distance above the base plate. A clearance hole 78 is also provided in the bracket to allow passage of a cover fastening rivet entering aperture 38.

Aperture 80 in base plate 10, Fig. 4, allows the stylus 34 to project from the cartridge to contact a record. It will be noted that, in the form of the invention shown, the free portion of spring 32 extends upwardly away from the base plate 10 and forwardly to connect with the armature. In a modified form, the spring may be flat and spaced the desired distance above the base plate. A small quantity of a viscous, non-drying, tacky material 82 is placed in the space between the spring and the base plate. This material serves to damp the resonant vibrations of the spring and thereby aids in obtaining a more uniform frequency response characteristic.

The anchored portion of spring 32, as illustrated in Fig. 6, is generally diamond-shaped and the free portion is tapered down to a width substantially the same as the thickness of the armature. The material of the spring is preferably beryllium copper, altho other suitable non-magnetic materials may be used if desired.

The point of attachment of the spring to the armature is substantially at the axis of gyration of the armature which, in the present case is about two thirds of its height from the lower edge. As explained above, at all frequencies below the resonant frequency of the stylus-armature-spring combination the armature will rotate about the torsional axis of the spring, while at all frequencies above the resonant frequency of the combination the armature will act as tho the spring did not exist and will rotate about its axis of gyration. Hence, with the axis of gyration and the torsional axis of the spring substantially coinciding, the armature will rotate about the same axis in response to lateral undulations in a record groove at practically all frequencies except those in the immediate vicinity of the resonant frequency. At resonant frequency the armature tends to assume an exaggerated lateral vibration and the spring bends laterally in its own plane. The damping action of the material 82 will tend to reduce this exaggerated lateral vibration and the resultant variation in the response level.

In order to reduce record wear it is desirable not only to hold the load on the stylus point to a minimum but also to reduce the inertia of the armature and the centering force acting on it to a minimum so that there will be less resistance to the movement impressed on the stylus point by the undulations of the record groove. In the device of the present invention the armature is approximately one eighth inch square and one thirty-second inch thick and the thickness of the spring is preferably from six to eight thousandths of an inch. Consequently the resistance to both lateral and vertical movements is extremely low.

The relation of the armature to the pole pieces is best shown in Fig. 3. In the no-load position the lower edge of the armature is flush with the lower edges of pole pieces 18. At the same time its upper edge lies just slightly above the lower edges of face plates 20. The maximum vertical movement of the armature is equal to or less than the thickness of pole pieces 18. The upper limit is determined by recession of the stylus 34 into the cartridge until it is flush with the lower edge thereof. With this construction it will be apparent that with vertical movement of the stylus the magnetic reluctance across one pair of opposite pole pieces increases at the same rate as the magnetic reluctance across the other pair decreases provided the upper and lower gaps are of equal width. Thus the total reluctance, and hence the total flux, will remain constant so long as the armature remains rotationally neutral.

The operation of the device described above will now be explained with reference to the diagrammatic sketches of Figs. 8, 9 and 10.

Figure 8:
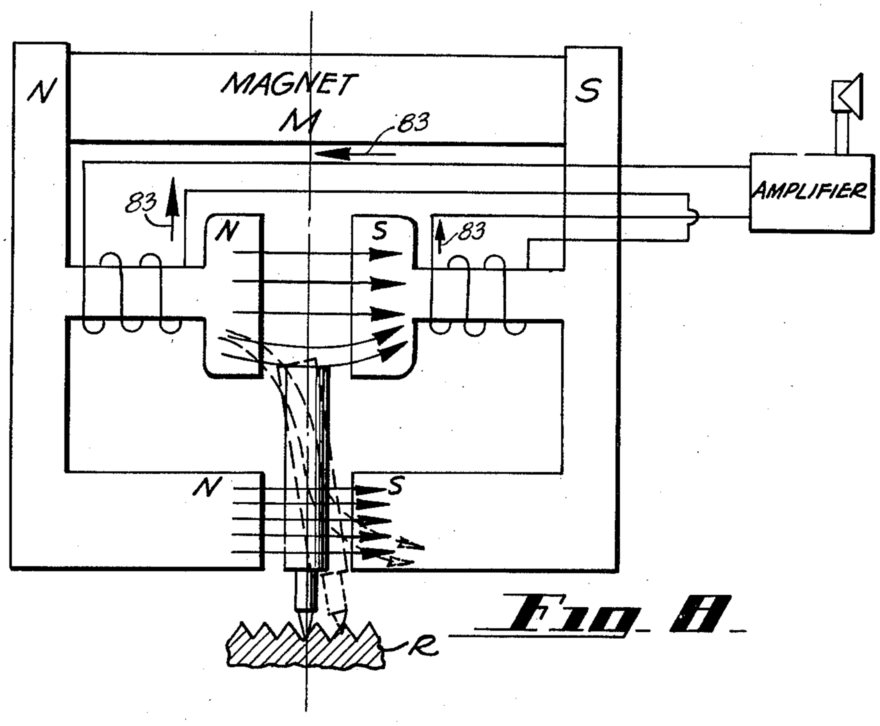
Fig. 8 is a diagrammatic sketch of the magnetic and electric elements of the invention, illustrating its operation in reproducing lateral recordings.

Fig. 8 illustrates the wiring arrangement and armature movement for reproduction of lateral recordings. The left and right hand magnet extension arms are placed in juxtaposition to the north and south poles of magnet M. The left hand extension is provided with upper and lower north pole pieces and the right hand extension is provided with upper and lower south pole pieces, defining a vertically arranged gap of uniform width between them. An armature, located centrally in the gap, is provided with a stylus adapted to engage and be acted upon by the grooves of a record R. The coils wound upon the two upper pole pieces are so connected in circuit with the amplifier that a simultaneous increase of flux thru both of them will produce opposing voltages, while a simultaneous decrease of flux thru one and increase of flux thru the other will produce aiding voltages.

When the armature is rotationally neutral, the flux distribution will be as generally indicated by the arrows in solid lines and no flux will pass vertically thru the armature. Since the reluctance of the lower gap is decreased by the presence of the armature, the flux density will be higher than across the upper gap, altho there will be a small area of concentration of magnetic lines of force thru the upper edge of the armature as indicated. So long as there is no change of flux no voltage will be produced in the coils.

When the armature is rotated counter-clockwise by movement of the stylus in response to a lateral undulation in the record groove, it will move to the position indicated by the dotted lines. In this position the air gap between the upper north pole piece and the upper edge of the armature is decreased, as is the gap between the lower south pole piece and the lower edge of the armature. The other two gaps are correspondingly increased. As a result, magnetic lines of force, indicated by the dotted arrows will flow from the upper north pole piece vertically thru the armature to the lower south pole piece and fewer lines of force will flow from the upper north to the upper south.

The increase of flux in the upper north pole piece will generate a voltage in its associated coil and the decrease of flux in the upper south pole piece will generate a voltage in its associated coil. With the coils wound and connected as shown, the two voltages will be additive, and a resulting signal will be introduced into the amplifier. The arrows 83 indicate the direction in which current would flow thru an external circuit under this condition. As will be understood, the signal will be proportional to the velocity of movement of the armature. Movement of the armature in a clockwise direction will produce a voltage of opposite sign in a similar manner.

If dust or dirt or a local high spot in the record groove should produce a vertical movement of the armature, it will decrease the air gap and consequently the magnetic reluctance between the two upper pole pieces. There will be a substantially equal increase in flux in both of them and therefore substantially equal voltages will be produced in both associated coils. However, with the coils connected as shown, these voltages will be of opposite sign and will cancel out.

With the armature in an upwardly displaced position there will be more flux across the upper pole pieces and less across the lower ones and the total flux thru the system will be substantially the same. A given rotational displacement will now decrease the reluctance of the diagonal flux path to the same extent as when the armature is in the lower position and therefore the voltages produced will be the same. Consequently uniform response is obtained regardless of vertical undulations in a laterally cut record which may cause vertical movement of the armature while playing such laterally cut record.

Figure 9:
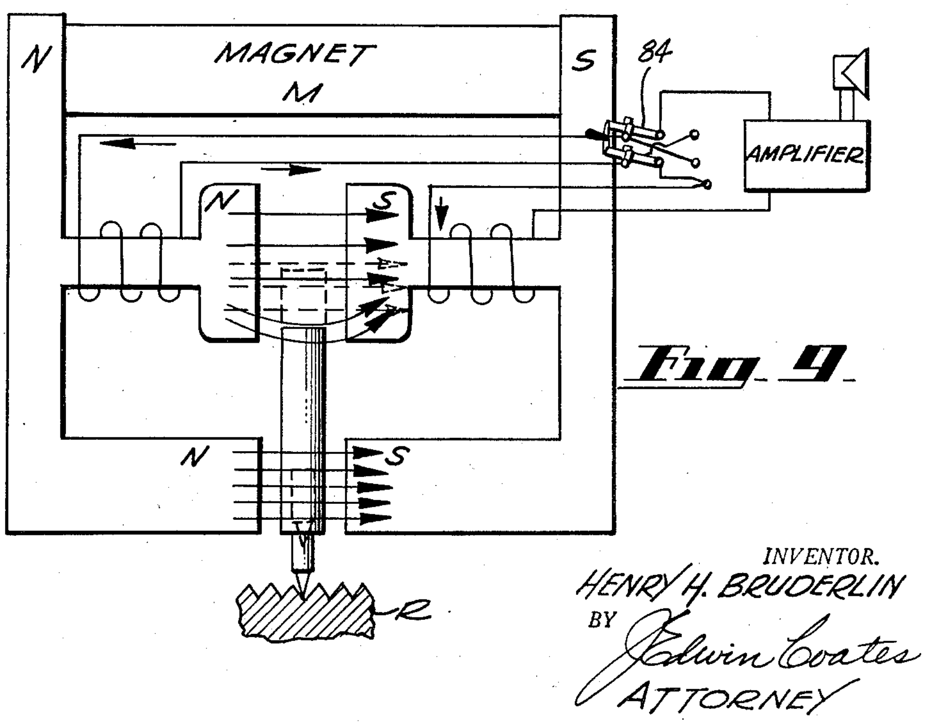
Fig. 9 is a diagrammatic sketch similar to Fig. 8 illustrating the operation of the invention in reproducing vertical recordings.

The illustration of Fig. 9 is substantially the same as that of Fig. 8, except that the circuit includes a switch 84 adapted to permit the terminals of one coil to be reversed with respect to those of the other coil. With the switch in the position shown, the coils are properly connected to reproduce vertically cut records. When the armature is in neutral position the lines of force are as indicated by the arrows in solid lines, and no signal is produced. However, when the armature is moved upwardly by vertical undulations in the record groove it fills more of the gap between the upper pole pieces and decreases the magnetic reluctance, with a corresponding increase in flux as indicated by the dotted arrows. With the coils wound and connected as shown, the voltages will be additive and the sum of the voltages produced will be impressed on the amplifier.

If any disturbance in the vertical recording should cause a rotational movement of the armature there would be a relative increase and decrease of flux thru the two coils as described above with respect to reproducing lateral recordings. However these voltages would be of opposite sign and cancel each other out so that no undesired signal would be produced.

The circuit described above in connection with vertical recordings is produced when the reversing switch 84 is in the position shown in Fig. 9. If the switch is thrown to the right the coils will be properly connected for reproducing lateral recordings in the manner previously described with reference to Fig. 8.

Figure 10:
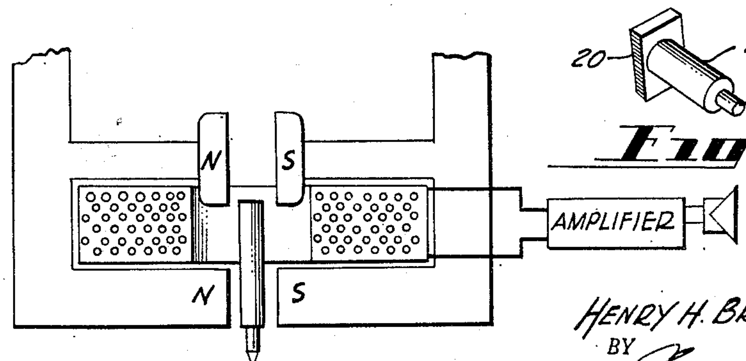
Fig. 10 is a diagrammatic sketch of a modification in which a single coil replaces the pair of coils shown in Fig. 8.

The diagrammatic sketch in Fig. 10 illustrates a modification in which a single coil having a vertical axis is substituted for the pair of coils in the forms previously described. This modification is suitable only for reproducing lateral recordings. When the armature is rotated in either direction the changes in flux will be the same as those described with reference to the form of Fig. 8. Thus, when the armature is rotated counterclockwise, flux will flow downward thru it from the upper north pole piece to the lower south pole piece, and when the armature is rotated clockwise the flow will be upward thru it from the lower north pole piece to the upper south pole piece. The coil is sensitive only to changes in the flux passing vertically thru the armature and voltages are generated therein in accordance therewith. The structure of this reproducer, other than the coil arrangement, is identical with that of the forms previously described. The form of the invention illustrated in Figs. 8 and 9 may be used with a coil associated with only one of the pole pieces but, with the elimination of the second coil, it will no longer be possible to segregate signals produced by lateral and vertical undulations.

It will be understood that all of the elements in the cartridge are to be made of brass or other non-magnetic material except the magnet, magnet extension arms, pole pieces, and armature, the latter elements being of a material having high magnetic permeability at high flux densities.

It will be apparent from a consideration of the preceding description that the present invention provides a rugged and durable reproducer which exerts a minimum pressure on the stylus, as well as high fidelity and high response level. Also the structure is such that it may be very accurately adjusted both during and after manufacture and will maintain its accuracy during a long service life.

Various changes and modifications in the construction and arrangement of parts will occur to those skilled in the art which do not depart from the invention as set forth, and it is intended that all such changes and modifications shall be comprehended within the scope of the following claims.

I claim:

1. A transducing device of the magnetic type comprising a base, a permanent magnet secured to said base, a pair of pole pieces one individual to each of the poles of said magnet and secured thereto, said pole pieces extending beyond the body of said magnet and having projections directed inwardly of said poles and defining an air gap therebetween, a pair of pickup coils one secured to each said pole piece, the axis of each said coil being parallel to a said projection, each said coil having a core in magnetic-circuit relation with said pole pieces, the inner opposed faces of said cores being substantially co-planar with the opposed inner faces of said projections, a relatively thin, flat armature positioned for movement in the spaces defined by said opposed faces of said cores and projections with its principal plane parallel to said faces, and a resilient cantilever support for said armature secured at one end to said base and carrying said armature at the free end thereof, and a record engaging stylus carried by said armature.

2. A transducing device of the magnetic type for selective reproduction of lateral or vertical recordings comprising a permanent magnet having a pair of pole pieces extending therefrom, each said pole piece being bifurcated to provide two sets of related north and south poles, each set of one north and south pole being collinear and having a gap therebetween, the four poles lying substantially in a common vertical plane, each of one related set of north and south poles having a coil thereon, and a relatively thin, flat magnetic armature supported in said gaps with its principal plane parallel to said faces for both rotational and vibratory movement with respect to said poles depending upon whether lateral or vertical reproduction is desired, rotational movement of said armature influencing flux through said armature and a diagonal pair of north and south poles, and vibratory movement thereof influencing flux through related sets of north and south poles.

3. A transducing device of the magnetic type comprising means for producing two substantially parallel flux fields, a magnetic armature, means for supporting said armature for rotational and rectilinear movement in said fields comprising a thin, flat resilient cantilever member fixed at one end and having the armature secured at the other end, said armature being of thin, flat form and positioned with its transverse axis parallel to the direction of the flux and its axis of rotation substantially between said flux fields, and a stylus secured to the periphery of said armature.

4. A signal translating device comprising: a base having a forward portion and a rear portion; a thin flat leaf spring having a forward free end and a rear portion lying on the rear portion of said base; a support member overlying the rear portion of said leaf spring; means securing said base, spring, and support member together in compressive relationship; laterally spaced upstanding gripping members extending above said support member; a pair of magnetic pole members having forward portions and having rear portions lying on said support member between said gripping members; a magnet lying on said support between and gripped by said rear portions of said pole members; the forward portions of said pole members each having a first pole piece adjacent said base and a second pole piece spaced above said first pole piece; said pairs of pole pieces defining a narrow vertical gap therebetween; an armature of thin flat material disposed in said gap with its plane lying vertically in said gap and attached to the forward free end of said leaf spring for vertical movement and for rotational movement about an axis substantially parallel to said base; a stylus rigidly connected with said armature and projecting therefrom and adapted to engage a record member; and a pickup coil surrounding each of a pair of related pole pieces of opposite polarity.

5. A signal translating device as claimed in claim 4 in which the forward free end of said leaf spring extends upwardly at an acute angle to said base plate.

6. A signal translating device as claimed in claim 4 in which the forward free end of said leaf spring is spaced above said base plate and a mass of damping material is provided between said free end and said base plate.

7. A signal translating device comprising: a base; a magnet on said base having north and south poles; a pair of spaced elongated pole members horizontally disposed and having rear portions in magnetic relation to the north and south poles of said magnet respectively; the forward end of each pole member being divided into a pair of vertically spaced upper and lower pole pieces; the two lower pole pieces defining a vertical gap; the two upper pole pieces defining a vertical gap above and in alignment with said lower gap to produce a combined vertical gap of substantial extent; a thin flat armature disposed in said combined gap with its principal plane extending vertically and parallel to the faces of said pole pieces; a single thin flat leaf spring horizontally mounted on said base and attached at its free end to said armature substantially at the axis of gyration of the latter to provide an axis of rotation for said armature within said combined gap and substantially between the adjacent points of said four pole pieces; a stylus rigidly connected with said armature and projecting therefrom and adapted to engage a record member; and a pickup coil surrounding each of a pair of related pole pieces of opposite polarity.

8. A signal translating device comprising: a base; a pair of magnetic pole members of opposite polarity carried by said base and having free ends; each of said free ends being divided into a vertically spaced pair of upper and lower pole pieces laterally spaced from the upper and lower pole pieces of the opposite pole member to form a narrow vertical gap; a single flat cantilever leaf spring mounted on said base and having a free end extending into said gap and having a torsional axis substantially normal to the vertical axis of said gap and located substantially between the upper and lower pole pieces; a thin flat armature having its principal plane extending vertically in said vertical gap and so attached to the free end of said spring that the axis of gyration of said armature substantially coincides with the torsional axis of said spring; said armature in operative position lying between said upper pole pieces and between said lower pole pieces; a stylus rigidly connected with said armature and projecting therefrom and adapted to engage a record member; and at least one pickup coil mounted in proximity to said pole pieces.

HENRY H. BRUDERLIN.

REFERENCES CITED

The following references are of record in the file of this patent:

UNITED STATES PATENTS

| Number | Name | Date |
|---|---|---|
| 1,577,294 | Pihl | Mar. 16, 1926 |
| 1,591,233 | Paterson | July 6, 1926 |
| 1,645,139 | Harrison | Oct. 11, 1927 |
| 1,831,787 | Goudy et al. | Nov. 10, 1931 |
| 2,027,169 | Harrison | Jan. 7, 1936 |
| 2,107,050 | Bender | Feb. 1, 1938 |
| 2,238,863 | Norton | Apr. 15, 1941 |
| 2,373,181 | Fleming | Apr. 10, 1945 |
| 2,388,116 | Bruderlin | Oct. 30, 1945 |
| 2,444,336 | Cornwell | June 29, 1948 |
| 2,456,388 | Cornwell | Dec. 14, 1948 |
| 2,485,432 | Cornwell | Oct. 18, 1949 |